March 14, 1961

W. S. MILLER 2,974,564

PROJECTION SYSTEMS

Filed July 23, 1956

INVENTOR.
WENDELL S. MILLER
BY Lyon & Lyon
ATTORNEYS.

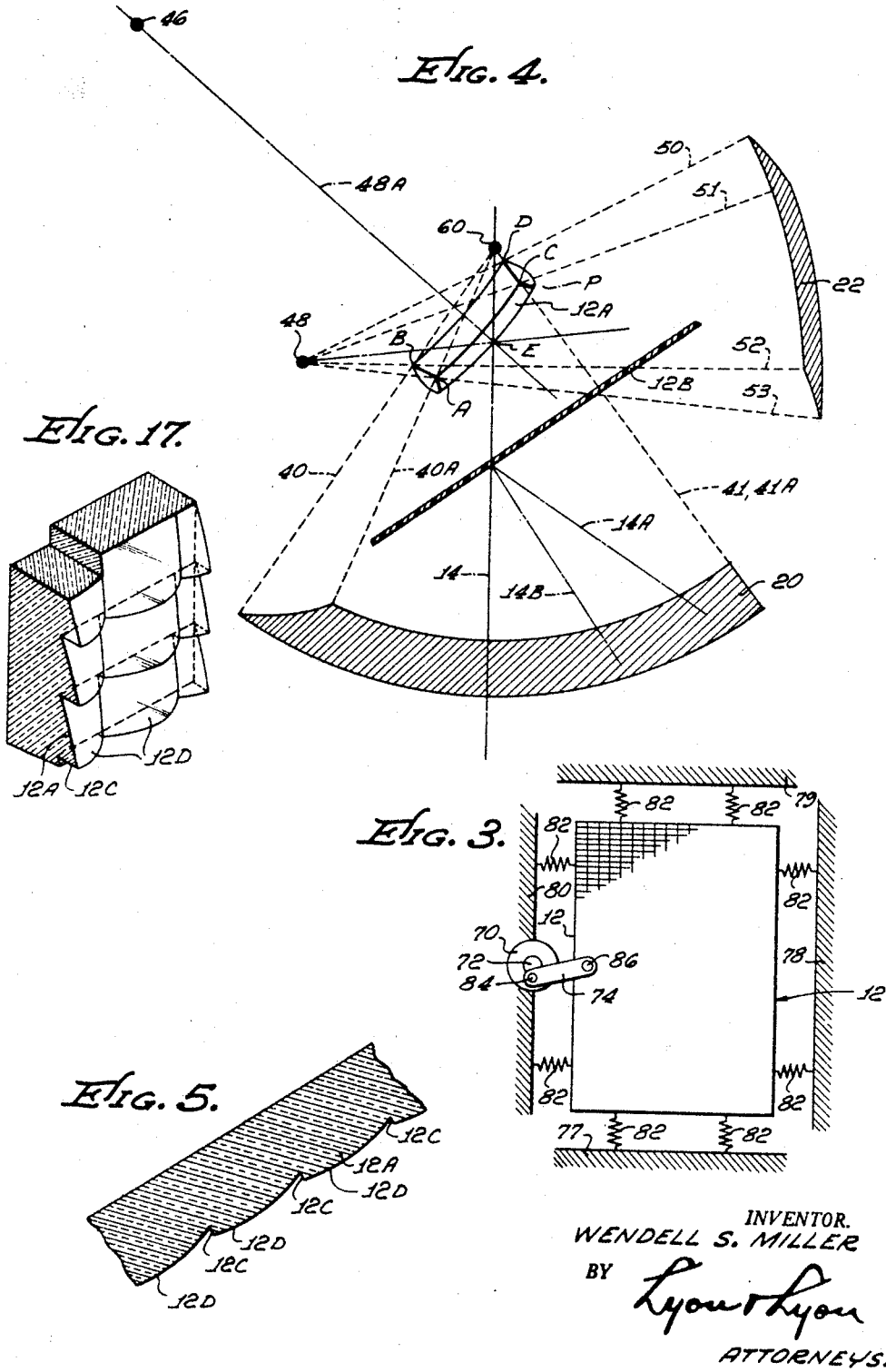

INVENTOR.
WENDELL S. MILLER
BY Lyon & Lyon
ATTORNEYS.

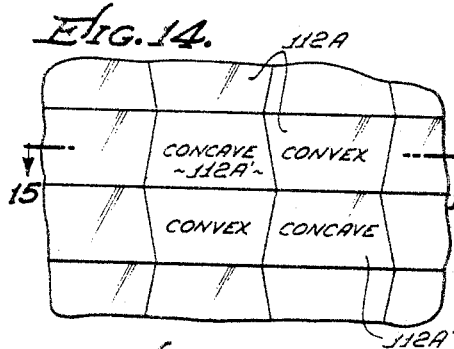
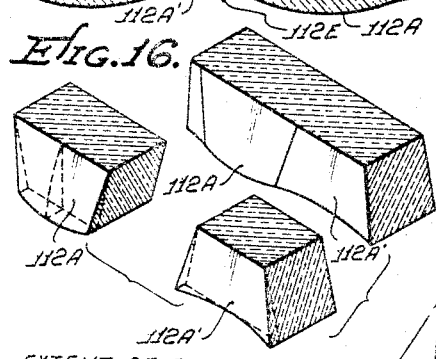
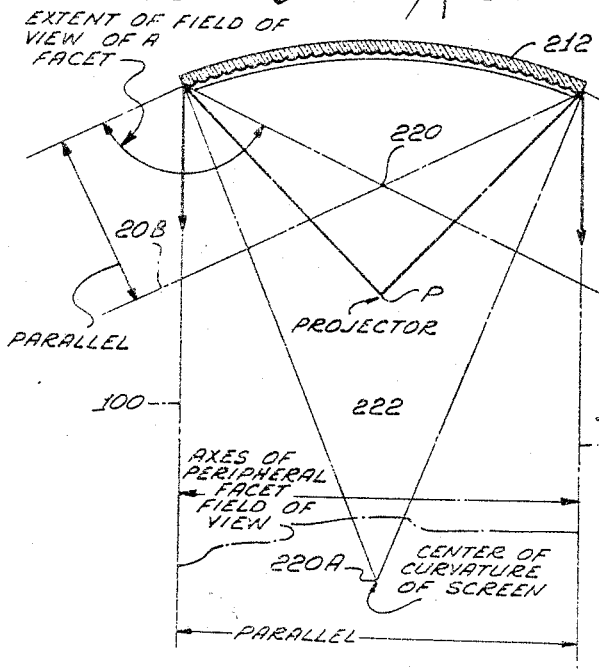
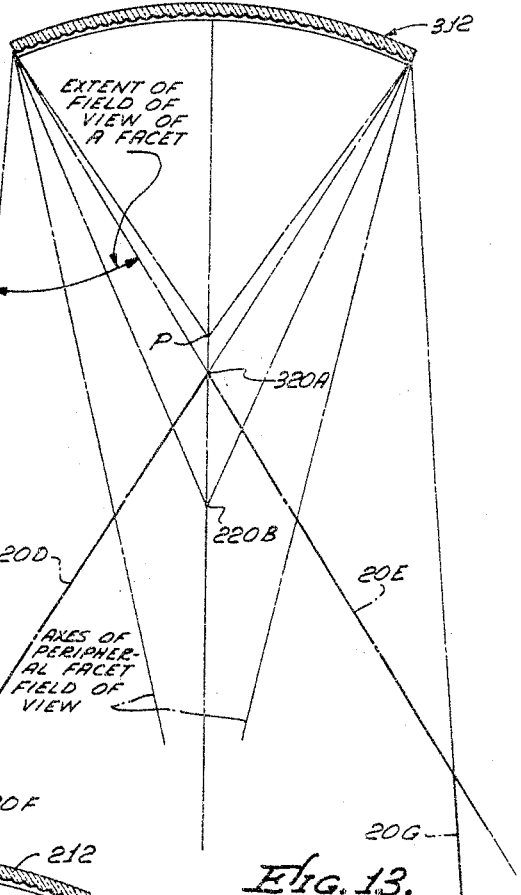

United States Patent Office 2,974,564
Patented Mar. 14, 1961

2,974,564

PROJECTION SYSTEMS

Wendell S. Miller, 1341 Comstock Ave., Los Angeles, Calif.

Filed July 23, 1956, Ser. No. 599,376

10 Claims. (Cl. 88—24)

The present invention relates to improved means and techniques useful in projecting either still or motion pictures and has particular applicability in those instances where it is desired to view projected pictures in rooms or areas such as drive-in threatres wherein the ambient light intensity is otherwise prohibitively high, and in this respect the present invention is considered to be an improvement in the systems described and claimed in my co-pending application, Serial No. 485,987, filed February 3, 1955, now abandoned in favor of my co-pending application Serial No. 734,656, filed May 12, 1958, in that in the use of the present arrangement the projection screen is coated with a protective coating, and the optical system is so arranged that reflections from such protective coating do not enter the field of view.

In general, the present system involves a multi-facet screen covered with a protective coating with means for supporting such screen at an angle inclined to the axis of a projected beam, and a light absorbent structure which absorbs that ambient light that otherwise might be reflected into the viewing area from the direction of the screen, the screen being useful either for light reflection or for light transmission, as illustrated herein.

An object of the present invention is, therefore, to provide an improved projection system of the character indicated above, using a protective coated screen that may be used either for light transmission or light reflection.

A specific object of the present invention is to provide a system of this character in which the screen consists of a plurality of light reflecting elements, each arranged to reflect a corresponding portion of the image which is focused on the screen.

Another specific object of the present invention is to provide a system of this character in which the reflecting screen consists of a plurality of reflecting facets, each of which is arranged to reflect into the viewing area a corresponding portion of an image which is focused on the screen, the picture being projected generally along an axis which is inclined with respect to the general plane of the screen.

Another specific object of the present invention is to provide a system of this type in which a focus screen consisting of a plurality of reflecting facets is inclined both with respect to the projection axis and the viewing axis, with such facets arranged to reflect light in accordance with one form of the present invention, and to transmit light in a different form of the present invention, into the viewing area from a predetermined area which includes the projection axis with, however, provisions in such area for absorbing that light which otherwise might result in dilution of the picture that is being projected along said projection axis.

Another object of the present invention is to provide an improved projection system of this type with provisions for moving the screen to enhance the picture quality.

Another object of the present invention is to provide an improved projection screen involving a plurality of facets covered with a smooth protective coating that is easily cleaned for picture transmission or picture reflection, as the case may be.

Another object of the present invention is to provide an improved screen having a novel shape and arrangement of facets thereon for achieving improved results.

Another object of the present invention is to provide an improved projection system of this character in which the individual facets on the screen are so shaped as to allow the use of a protective coating over the same.

Another object of the present invention is to provide an improved system of this character incorporating a smooth outer surface which may be easily cleaned in association with specially shaped and disposed facets underneath the protective surface so that the facets serve to direct the projected picture into the viewing area while the plain protective surface reflects light incident thereto into a region outside of the viewing area.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 3 illustrates a modified form wherein the screen illustrated in Figure 1, instead of being mounted stationary, may be vibrated.

Figure 4 illustrates generally that field or area from which light may be reflected from an individual facet of a composite screen illustrated in Figure 1 into the viewing area and serves also to illustrate generally the area into which the light from the protective fare is reflected.

Figure 2:
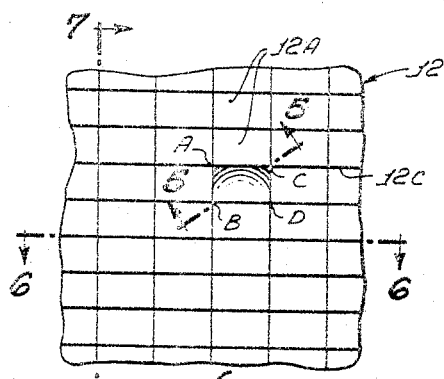
Figure 2 is a view in elevation showing a portion of the front of a projection screen illustrated in Figure 1.
Figure 6:
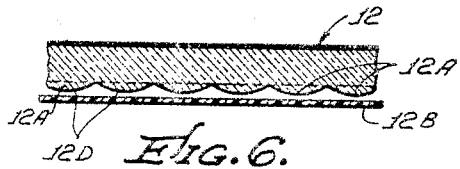

Figures 5, 6 and 7 are sectional views taken respectively on corresponding lines 5—5, 6—6 and 7—7 of Figure 2.

Figure 8:
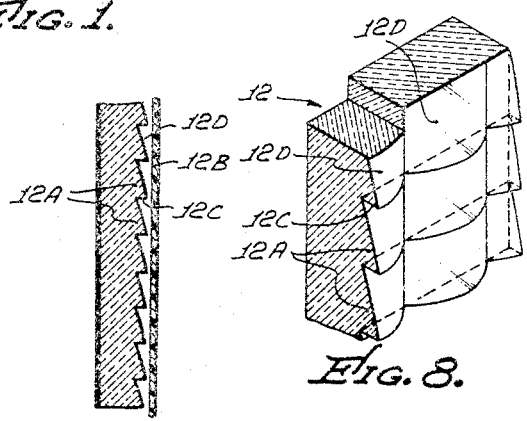

Figure 8 is a perspective view showing a portion of the facet structure of the screen illustrated in the previous figures.

Figure 9:
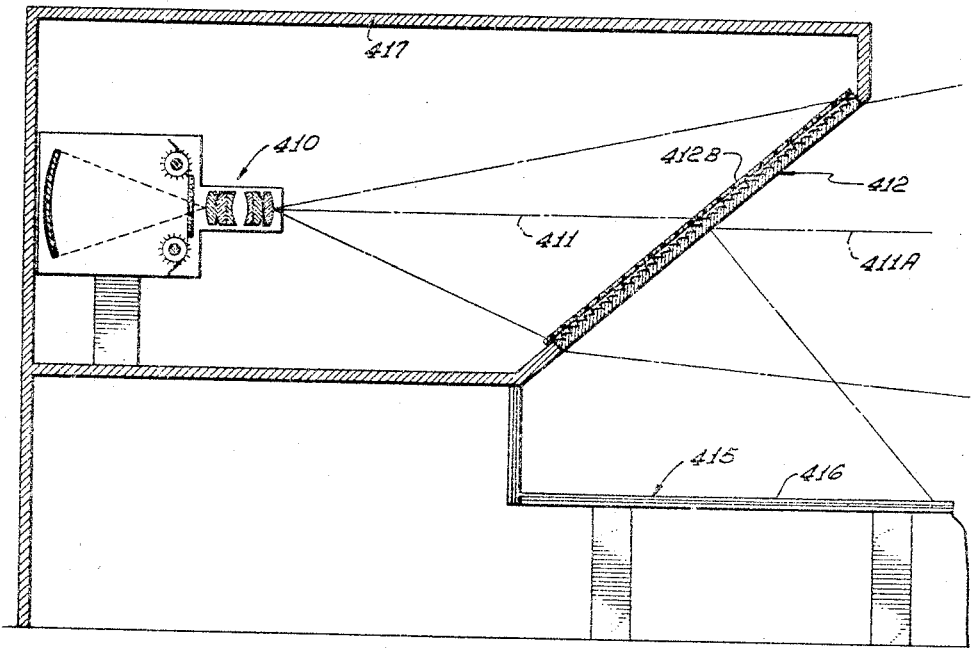

Figure 9 illustrates another modified arrangement wherein a screen having a structure illustrated in previous views is used as a light transmitting element.

Figure 10:
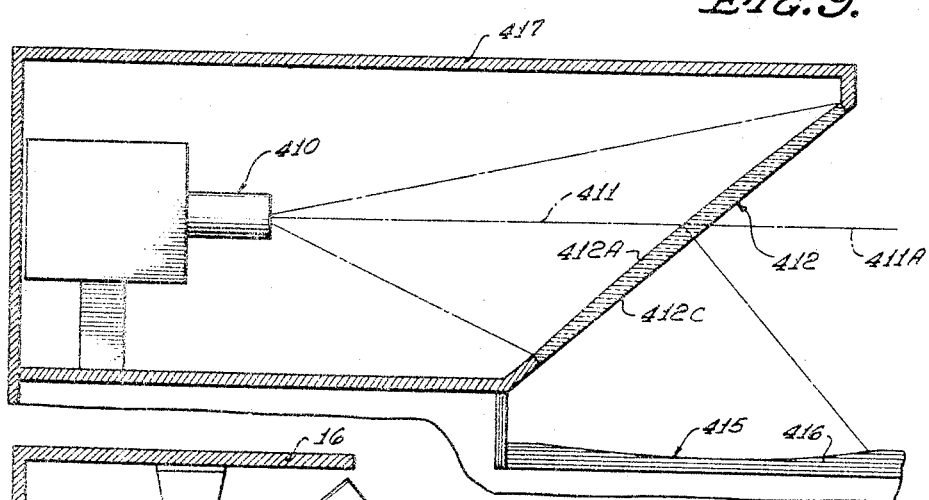

Figure 10 illustrates another modified arrangement embodying features of the present invention.

Figure 11:
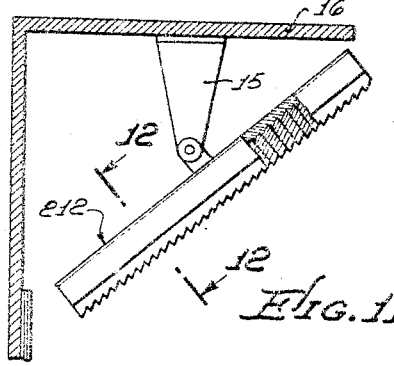

Figures 11 and 12 illustrate still another modified form of the present invention; Figure 12 being a view taken generally on the line 12—12 of Figure 11.

Figure 13 illustrates still another modified form of the present invention using a screen which is more curved than that screen illustrated in Figure 12.

Figures 14 and 15 and 16 illustrate other facet shapes and arrangements that may be used in the screens illustrated in the previous figures, with the exception of Figure 10, it being noted that Figure 15 is a sectional view taken substantially on the line 15—15 of Figure 14; and Figure 16 is a perspective of a portion of the facet structure.

Figure 17 is a perspective view similar to that illustrated in Figure 8 and is also used in accordance with features of the present invention. In this case, the facets illustrated in Figure 17 have a greater overhanging portion at their junction than is the case in Figure 8.

Figure 1:
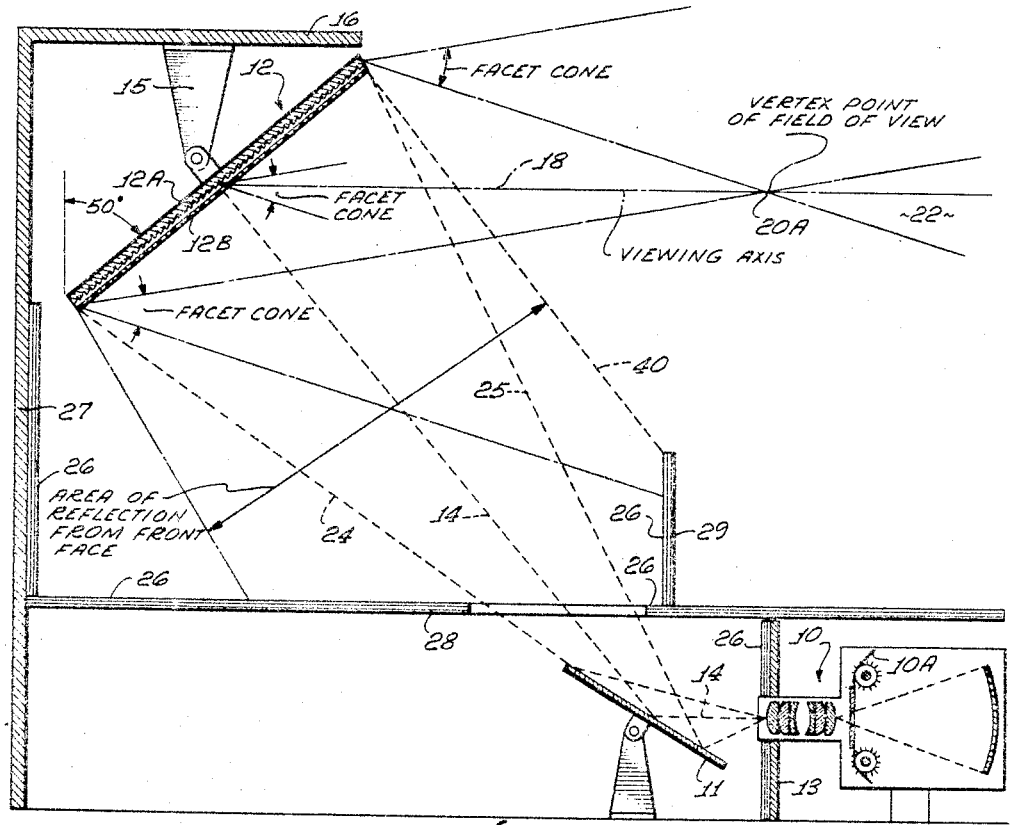
Figure 1 illustrates a section through a projection system embodying features of the present invention.

As illustrated in Figure 1, the optical system includes a projection system which is illustrated herein as a motion picture projector 10 and serves to project a picture onto a mirror 11 which may be plane, but which is preferably shaped to minimize or eliminate astigmatism and curvature field so that the same may be reflected onto the screen 12 in focus for the general purpose of projecting pictures in the general area indicated by the numeral 22. For example, the mirror 11 may be cylindrical, elliptical, or it may instead be a prism. Also, if desired, the desired correction may be introduced into the system by predistorting the pictures in the frames of the movie film 10A such that the picture as viewed by a viewer in the area 22 sees an undistorted picture.

It is understood that instead of a motion picture camera 10, a projector of still pictures, television pictures or other types may be used, and in each case the projector may be positioned to project pictures directly onto the screen 12 without the aid of the reflecting mirror 11. In other words, the projector 10 may be positioned at the virtual image point of the mirror 11 on an extension of the central light beam 14 which is understood to represent the main or central projection axis. It is observed that this projection axis 14 is inclined with respect to the general plane of the screen 12. Such screen 12, as shown in Figure 1, is pivotally mounted in an adjusted position on the bracket 15 which extends downwardly from the stationary supporting structure 16 at an angle with the vertical of approximately 50 degrees, as indicated. It is noted also that the viewing axis corresponds generally to the line 18, this line 18 also being inclined with respect to the general plane of the screen 12, and such line 18 serves to indicate the central position of those light beams which are reflected onto the viewing area or field 22.

In accordance with an important feature of the present invention, as contrasted to the arrangement shown in my abovementioned co-pending application, the screen 12 is provided with an outer protective plane surface 12B which may be easily cleaned and under which a plurality of specially designed facets 12A are disposed under protection of the outer surface 12B.

In general, the facets 12A are so shaped and disposed that they direct elemental portions of the projected picture into the viewing area 22, while the smooth protective coating 12B serves to direct light (either ambient or light from the projector) reflected therefrom into an area outside of the viewing area 22.

In Figure 1, it is understood, of course, that some of the light from the projector 10 is transmitted through the protective coating 12B onto the facets from where such light is reflected into the viewing area 22. On the other hand, some of the light, either ambient or light from the projector 10, is reflected from the surface 12B, and a distinction is thus made between that light which is reflected from the facets 12A and that light which is reflected from the protective coating 12B. In accordance with features of the present invention, the light reflected from the facets, on the one hand, and from the protective coating 12B, on the other hand, is reflected into different areas. For that purpose, the facets 12A are shaped as shown, particularly with reference to Figure 7, such that no portion of a particular facet 12A has a surface which extends parallel with the surface of the protective coating 12B. Preferably, as shown, these facets 12A, as seen in cross-section in Figure 7, appear as a series of sawteeth, with each facet being generally rectangular, as illustrated in Figure 8, and being defined in cross-section by portion 12C that extends generally perpendicular to the plane of the protective coating 12B and with a curved, arcuate or concave portion 12D, contiguous with the portion 12C. The shape of the horizontal and/or vertical cross-section portion 12D may, in a special case, be defined mathematically in accordance with the following mathematical equation $$y = \frac{1}{c} \log_e \cos cx$$

where $c$ may be equal to 1. In a plane containing a reflecting element described by this equation, the angle which the tangent to the surface in this plane makes with the $x$ axis of the plane is proportional to the abscissa of the curve at the tangent point. This means that beams of parallel light of uniform intensity are reflected with equal intensity in those directions in which they are reflected from such a surface.

Preferably, these facets, as illustrated in Figure 8, have a projected area which is generally rectangular, as illustrated in Figure 8, for ease of manufacture, so that the longer dimension of the rectangle extends in the horizontal plane to thereby provide a corresponding viewing field which extends a greater angle in the horizontal direction than in the vertical direction. However, these facets may be so shaped that keystoning the shape of the viewing field cone is avoided, so that the viewing cone extending from point 48 (Figure 4) through field 22 is of such shape as may be desired. Indeed, the facets, instead of being identical, may be in the form as illustrated in connection with Figures 14, 15 and 16, wherein the facets of the screen 112 comprise a series of trapazoidal shaped facets 112A, 112A′ which, when arranged in adjacent side-by-side relationship, provides a smooth undulatory surface 112E (Figure 15). For this purpose, the facets 112A have a convex outer surface, and the facets 112A′ have a concave outer surface that blend together, as illustrated in Figure 15. The reflecting surface of the facets of the screen 112 is also protected by a plane protective coating, and the facets 112A and 112A′ each has a reflecting surface, no elemental portion of which extends parallel with the plane of the plane protective surface to achieve the results indicated above in connection with the discussion of facet 12A. One of these facets 12A is illustrated in a three-dimensional representation in Figure 4, the corners thereof being designated as A, B, C and D, and these letters correspond to the same corners illustrated in Figure 2.

Each of these facets 12A is capable of reflecting light which may be directed at it from the field or area represented by the shaded area 20 in Figure 4 and to reflect some of such light from such field 20 into the solid cone of the viewing field defined by the point 48 and the shaded area or field 22. Such reflection is from the surface of the individual facets from planes tangent to the outer surfaces. One of such tangent planes is represented in Figure 4 by the line P which is tangent to the face of the facet at point E. There is also indicated in Figure 4 by the extension of the line 48 through point E the principal beam of the projected light source represented by the line 14. As a matter of fact, the only light which may be reflected into the viewing area 22 from the facet 12A is that light which may be derived from the shaded area 20. This area 20 is preferably covered with light absorbing material so that the only light which enters the viewing field is that light being projected by the projector. This means that when the screen 12 is not being illuminated by the projector, the screen 12 appears dark to a viewer in the viewing field 22 even though the ambient light intensity is relatively high.

The reflecting surface of each facet 12A (112A and 112A′ in Figures 14–16) is related to the plane of the protective surface 12B, as described above, so that any light reflected from the protective surface 12B is directed into an area outside of the field of view. As illustrated in Figure 4, light, for example travelling in the direction indicated by the line 14 and reflected from the surface 12B, is reflected in the direction indicated by the line 14A into an area other than the area 22. The particular area from which light may come to be reflected by the protective surface 12B into the viewing cone is so treated to absorb ambient light. This area may be coextensive with the area 20, overlap the area 20 or be outside of the area 20, so long as the light reflected from the face 12B does not enter the field of view 22, established by the particular shape and disposition of the facet 12A.

It is understood that each of the facets or elements 12A (or facets 112A and 112A') serves to reflect into field 22 the corresponding elemental portion of the image of the entire picture which is being focused by the projector 10 on that particular facet. In other words, these elemental portions of the image reflected from the facets 12A are combined optically in the viewing field 22 so that the viewer sees one complete picture. In order to improve the resolution, these facets 12A are preferably made as small as possible, consistent with good adherence to their desired shape and ease and inexpensiveness of manufacture. In order to improve the resolution while yet keeping the facet size relatively large (i.e., improve the quality or appearance of the viewed picture so that the same does not appear to be a composite of elemental portions), the screen 12 (or 112) as a whole may be oscillated through a relatively small distance in the plane of the screen at a frequency such that the apparent transverse movement of a spot of reflected light coming from each facet is obscured by persistence of vision. Thus, means may be provided for oscillating the screen 12 in its plane, as shown in Figure 3.

It is observed that the area 20 is relatively large, being much larger than the area defined by the light beam from the projector 10, and for that reason, under usual conditions of ambient light, would be capable of supplying more illumination to the screen than the projector. In accordance with important features of the present invention, such area corresponding to the area 20 comprises the area of light absorbing material. Thus, the area of the projected beam is defined generally in Figure 1 by the outside lines 24 and 25 which extend between the mirror 11 and the screen 12. This area 24, 25 thus defined is much smaller than the area 20 represented in Figure 4. While the projected beam passes through such area 20, the remaining portion of such area 20 is lined with light absorbing material as, for example, the light absorbing material 26 on the face of the vertical wall or baffle 27, the light absorbing material 26 on the horizontal extending apertured stationary member 28 and the light absorbing material 26 on the other vertical extending wall 29. It is noted that the light baffle 13 is also lined with light absorbing material 26, since, optically speaking, the same may be considered to define a portion of the area 20. This is particularly obvious when no mirror 11 is being used.

It is apparent that the vertical baffles 27 and 29 may be omitted, but in such case a corresponding greater portion of the horizontal extending baffle 28 must be covered with light absorbing material 26. Also, instead of being vertical, these baffles 27 and 29 may extend upwardly at any other angle so long as their upper edges intercept the lines 41 and 40, respectively. The effect of the baffles 27 and 29 is to render the system more compact. The baffle 29 extends upwardly a sufficient height so as not, however, to block out the light which is being reflected from the facets 12A into the viewing area which is being reflected from any one of the facets 12A into the viewing area 22. These baffles 27, 29 also encompass the area which receives light that is reflected from the outer protective face 12B, regardless of where such light may originate, i.e., for example, ambient light from the viewing field or light from the projector 10 itself.

In other words, that area generally within the limiting lines 40 and 41 should be covered with light absorbing material so that there is minimum reflection of ambient light which otherwise might produce dilution of the image, i.e., impair the contrast in the viewing area or field 22.

This field 20, thus defined by the lines 40 and 41 in both Figures 1 and 4, is referred to generally as the field 20 of interfering light, but it is within this field and through this field that the beam 14 is projected.

The relationship between the fields 20 and 22 may be determined graphically, knowing the dimensions and curvature of the facet 12A and observing the optical rule that the angle of incidence as measured from the normal to a reflecting surface is equal to the angle of reflection from the normal to such a surface. Figure 4 is drawn for the special case of convex spherical facets, in which case the center of curvature of the reflecting surface is designated by the point 46 and the radius of curvature is designated by the line 48A. A similar diagram may be constructed for facets of other shapes by applying the law of reflection to the surface of the facet at each of its surface points in turn.

The virtual image point in the spherical reflecting facet 12A is designated by the point 48 at which also the lines 50, 51, 52 and 53 converge. In any case, these lines 50, 51, 52 and 53 define the outer points of the viewing field 22 and pass through corresponding edges of the facet 12, as shown.

The field or area 20 is defined generally in like manner by lines 40, 40A, 41 and 41A, each converging at the point 60 and passing through corresponding edges A, B, C and D of the facet 12A.

As illustrated in Figure 3, the screen 11 is moved in its plane by a motor-driven cam arrangement which comprises a disc 70 affixed to the motor shaft 72. A link 74 is pin connected at opposite ends thereof to the disc 70 and the screen 12. The link 74 is pivotally mounted on pin 84 and the pin 86 serves to rigidly connect the link to the screen. The screen 12 is resiliently mounted in a stationary framework including the stationary elements 77—81 by spring means 82. Thus, as the motor shaft 72 rotates, the screen 12 is oscillated in both the horizontal direction as well as in the vertical direction to improve the quality of the viewed picture when the facet size is large, as mentioned above.

The field of view may be maximized and other advantages accrue when, as illustrated in connection with Figures 11, 12 and 13, the screens 212 and 312 shown therein, are curved.

For purposes of definition, the field of total view is defined as the intersection of the individual fields of view of all of the facets, i.e., the logical product, whereas the field of interfering light is the join of the fields of interfering light of all of the facets, a join being the logical sum.

By curving the screen, the field of total view is increased, and curving also reduces the field of frontal reflection, i.e., the field from which light is reflected from the front smooth protecting layer into the field of total view. Also, it is easier optically to project onto a curved screen than on a flat screen because less correction and/or Petzval curvature, as the case may be, is required of the projection lens. In the arrangement shown in Figures 11, 12 and 13, the facets have the same general shape as previously described in connection with Figure 8 or Figure 14. An optimum condition is considered to be achieved when the axes of the viewing cones from each of the facets are parallel, as indicated by the parallel lines 100 and 101. In this case, the angular spread of the field of view is maximized and is equal to the angle of the individual facet fields of view.

As the curvature is increased, as shown in Figure 13, the width of the field of view at extreme depths is reduced. The field of view in Figure 12 is bounded by the lines 20B and 20C which represent the edges of a cone. The point 220A in Figure 12 represents the center of curvature of the screen 212, and the point P represents the center of projection. It is noted that by increasing the curvature beyond the optimum condition illustrated in Figure 12, the vertex point of the field of view is extended forwardly toward the screen. This vertex point of field of view is represented by the point 20A in Figure 1, also by the point 220 in Figure 12 and by the point 320A in Figure 13. In Figure 13, the center of projection is the point P and the center of curvature is the point 220B; and the field of view is defined by the lines 20D, 20E, 20F and 20G.

Thus, as illustrated in Figure 13, by further increasing the curvature of the screen beyond that required to produce the optimum condition shown in Figure 12 in which the axes of the fields of view of the individual facets are parallel, the axes of the individual fields of view may be made to converge in front of the screen. In this case (i.e., Figure 13) the apex point 320A of the field of total view is moved closer to the screen for the same position of the projector and facet shape. However, this effect is accomplished at the expense of the angular width of the field of total view at a great distance from the screen. Thus, in Figure 13 the field of total view which would be defined by the lines 20D and 20E is further truncated by the lines 20F and 20G. This loss of field at great distance will usually prove to be a small sacrifice to pay for the increased viewing area near the screen occasioned by this configuration.

In both cases represented in Figures 12 and 13, the viewing area is increased over that which is obtainable using a flat screen in the same configuration.

In the modified arrangement shown in Figures 9 and 10, the same principle is used to enhance the contrast of a transmission screen system by so arranging the screen that ambient light is prevented from being reflected into the viewing field of the system by the surface of the screen towards the audience.

Thus, in the modified arrangement shown in Figure 10, a projection system is used, the projector 410 being disposed behind the inclined screen 412 which has a ground glass back surface 412A. The plane of the transparent screen 412 is inclined with respect to the horizontal projection axis 411 which is coextensive with the viewing axis 411A. The screen 412 is so inclined that all light passing to the field of view after reflection at the front planer surface 412B must have come from the area or region 415 which is covered with light absorbing material 416. The screen is, however, so arranged that light may be transmitted through the screen into the field of view after being focused on the back surface 412A of the screen. The screen 412 may be light absorbing itself so that light from the direction of the viewing field suffers some double absorption (i.e., travels through twice the thickness of the screen 412 before being reflected into the light absorbing area 415. One of the novel features in the arrangement shown in Figure 10 involves the concept of tipping the transmission screen 412 and the provision of the light absorbing area 415). The projector 410 in Figure 10 is enclosed in a light tight enclosure 417 of which the screen 412 provides a side.

In the modified arrangement illustrated in Figure 9 which is related to Figure 10, a different form of transmission screen is used. The screen in Figure 9 includes lenses either concave or convex, preferably concave lenses, so arranged that the light that would be reflected into the viewing area must have come from the blacked-out area. These lenses, which in this case are the elements which I otherwise refer to as facets, illustrated in Figure 8, may be covered with a transparent smooth film or surface 412. In all of these arrangements wherein facets are used, either the square facets, as illustrated in Figure 8, or Figure 17, or the trapezoidal facets, as illustrated in connection with Figures 14–16, may be used. The trapezoidal facets are preferred to minimize or eliminate keystoning of the field. In using a square facet, the boundary defining a section through the field of view normal to the viewing axis is trapezoidal, when, as illustrated, a rectangular facet is connected with respect to the field of view. By using trapezoidal facets, the boundaries of the section through the viewing field normal to the viewing axis may be made rectangular, or indeed may be shaped as desired, depending upon the outline of the trapezoidal facets.

As mentioned previously, the provision of the smooth transparent protective layer 12B introduces a surface from which objectionable frontal reflections may occur. It is understood that while the drawings, for purposes of simplicity, illustrate the protective layer 12B as being a flat strip, it is understood that the protective layer may be, for example, of clear plastic material which presents a smooth outer surface for ease of cleaning with the plastic material filling the interspaces between the reflecting facets. This clear plastic material is, of course, durable and transparent for the purpose of providing a protective coating and the same may be one of the well known so-called plastic materials having durability and transparency. The particular material is considered to be well known and thus, per se, forms no part of the present invention. While in the arrangement shown in Figure 1 the light, due to frontal reflection from the surface 12B, is directed into the field of interfering light defined by the light absorbing material 26, the field of interfering light and the field in which light from frontal reflections are directed need not necessarily be coextensive or overlap. Indeed, for example, the screen 12 in Figure 1 may be tilted so that it makes a lesser angle with respect to the vertical than the 50 degrees angle illustrated in Figure 1, so that the light from frontal reflections is directed into an area which lies above the field of view 22. In this latter instance, a light trap, i.e., a light absorbing area, may be disposed to receive such light from frontal reflections for absorbing the same.

Further, it is understood that the front surface of the protective coating 12B does not necessarily have to be completely planer so long as it satisfies the conditions for preventing the reflection of undesired light in the viewing field as described above, and indeed may also have curvature, as illustrated in connection with the protective and easily cleaned front transparent surfaces in Figures 12 and 13. It is noted further that the light which is reflected from the facets travels through twice the thickness of the protective transparent cover or layer 12B, and its index of refraction aids in extending the field of view. Thus, the plastic material may be used having, for example, an index of refraction of 1.5 which means that a ray of light entering the plastic layer is bent in its travel towards a reflecting facet, and also the same ray after reflection from the facet is bent after it leaves the protective layer. This has the general effect of allowing the use of a flatter facet than is otherwise the case when the protective layer of index of refraction greater than 1 is omitted.

While the particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a projection system of the character described, a screen having a multiplicity of specular reflectors thereon, a light projector having its principal beam inclined with respect to the general plane of said screen, the principal axis of the viewing field being also inclined with respect to the general plane of the screen and also with respect to the axis of said principal beam, an area through which said beam is projected being enclosed within light absorbing material, said elements being so shaped that the only ambient light falling on the screen and thence reflected into the viewing field must come from the aforesaid light absorbing material, so that, in the absence of light from said projector, said screen appears dark to a viewer in said viewing field, a transparent substantially smooth coating over said elements, said screen being inclined with respect to said principal beam such that light impinging and reflected from said coating is reflected in a region outside of said viewing field, said region comprising a light trap.

2. In a system of the character described, a screen having a plurality of light reflecting elements thereon, an area of light absorbing material adjacent said screen, means for focusing a light beam through a relatively small portion of said area at an inclined angle with respect to the general plane of the screen, the principal axis of the viewing field being also inclined with respect to the plane of said screen and also with respect to the principal axis of said light beam, said elements being so shaped that the only light falling on the screen and thence reflected into the viewing field must come from the aforesaid light absorbing material, a transparent substantially smooth coating over said elements, said coating being inclined with respect to the axis of said light beam such that light reflected from said coating is directed into a region outside of said viewing field.

3. A system as set forth in claim 1 in which means are provided for moving said screen to enhance the picture quality.

4. In a system of the character described, a screen comprising a plurality of specular reflecting elements, a viewing field which is subjected to ambient light adjacent said screen with the principal viewing axis being inclined with respect to the general plane of said screen, beam projecting means for projecting a light beam in focus on said screen with the axis of said beam inclined with respect to said plane and also with respect to said viewing axis, said light beam passing through an area which is exclusive of said viewing field, said elements being so shaped that said ambient light is reflected by said elements exclusively into said area, means in said area for preventing light other than that from the projector from entering the viewing field so that said screen, in the absence of said light beam, appears dark to a viewer in said viewing field, a transparent substantially smooth coating over said elements, said coating being inclined with respect to the axis of said beam such that light reflected from said coating is reflected into a region outside of said viewing field.

5. A system as set forth in claim 4 including means for moving said screen to enhance the picture quality.

6. In a system of the character described, a screen comprising a plurality of specular reflecting elements, a viewing field adjacent said screen, beam projecting means for producing a light beam in focus on said screen, said light beam passing through an area which is exclusive of said viewing field, said screen being subjected to ambient light, said elements being so shaped that said ambient light is reflected by said elements exclusively into said area so that said screen, in the absence of said light beam, appears dark to a viewer in said viewing field, a transparent substantially smooth coating over said elements, the plane of said coating being inclined with respect to said light beam such that light reflected from said coating is directed into a region outside of said viewing field.

7. In a system of the character described, a screen comprising a plurality of specular reflecting elements, a viewing field adjacent said screen, beam projecting means for producing a light beam passing through an area which is exclusive of said viewing field, the beam from said projecting means being inclined with respect to the tangent planes of said elements, with the viewing axis being also inclined with respect to said tangent planes, a transparent substantially smooth coating covering said reflecting elements, the plane of said coating being inclined with respect to said light beam such that light reflected from said coating is reflected into a region outside of said viewing field.

8. In a system of the character described, a screen having a plurality of facets, a transparent substantially smooth coating covering said facets, light projecting means for projecting a light beam having its principal axis inclined with respect to the plane of said coating, light trap means for receiving interfering light from said screen, and light trap means for receiving light reflected from said coating.

9. An arrangement as set forth in claim 8 in which the first and second mentioned trap means are substantially coextensive.

10. A system as set forth in claim 1 in which said screen is curved.

References Cited in the file of this patent

UNITED STATES PATENTS

| | | |
|---|---|---|
| 1,279,262 | Clark | Sept. 17, 1918 |
| 1,624,816 | Triana et al. | Apr. 12, 1927 |
| 1,942,841 | Shimizu | Jan. 9, 1934 |
| 2,381,614 | Moller et al. | Aug. 7, 1945 |
| 2,424,339 | Stechbart et al. | July 22, 1947 |
| 2,510,080 | Cuneo | June 6, 1950 |
| 2,552,455 | Pond | May 8, 1951 |
| 2,634,652 | Barth | Apr. 14, 1953 |
| 2,763,184 | Jackson | Sept. 18, 1956 |
| 2,804,801 | Mihalakis | Sept. 3, 1957 |
| 2,828,667 | Grossman | Apr. 1, 1958 |
| 2,837,008 | Erban | June 3, 1958 |